United States Patent
Lai

(10) Patent No.: US 11,301,545 B2
(45) Date of Patent: Apr. 12, 2022

(54) POWER EFFICIENT MULTIPLY-ACCUMULATE CIRCUITRY

(71) Applicant: Facebook Technologies, LLC, Menlo Park, CA (US)

(72) Inventor: Liangzhen Lai, Fremont, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 306 days.

(21) Appl. No.: 16/509,183

(22) Filed: Jul. 11, 2019

(65) Prior Publication Data

US 2021/0011971 A1    Jan. 14, 2021

(51) Int. Cl.
| | | |
|---|---|---|
| G06F 17/16 | (2006.01) | |
| G06N 3/04  | (2006.01) | |
| G06N 3/063 | (2006.01) | |
| G06N 3/08  | (2006.01) | |

(52) U.S. Cl.
CPC ............. G06F 17/16 (2013.01); G06N 3/04 (2013.01); G06N 3/0635 (2013.01); G06N 3/08 (2013.01)

(58) Field of Classification Search
CPC ..... G06F 17/16; G06F 9/3001; G06N 3/0635; G06N 3/08; G06N 3/0454; G06N 3/084; G06N 3/063; G06N 3/0481
USPC ........................................................ 708/190
See application file for complete search history.

(56) References Cited

U.S. PATENT DOCUMENTS

| | | | | |
|---|---|---|---|---|
| 2008/0154996 | A1* | 6/2008 | Yancey | G06F 15/7867 708/130 |
| 2017/0357889 | A1* | 12/2017 | Zhang | G06N 3/0454 |
| 2019/0205358 | A1* | 7/2019 | Diril | G06N 3/063 |
| 2020/0104692 | A1* | 4/2020 | Hill | G06F 5/06 |
| 2020/0320375 | A1* | 10/2020 | Abuhatzera | G06N 3/0481 |

OTHER PUBLICATIONS

Alberto Bonanno et al: "Data-Driven Clock Gating for Digital Filters", Sep. 9, 2009 {Sep. 9, 2009), Integrated Circuit and System Design. Power and Timing Modeling, Optimization and Simulation, Springer Berlin Heidelberg, Berlin, Heidelberg, pp. 96-105.
International Search Report and Written Opinion on PCT/US2020/041207 dated Oct. 22, 2020.

(Continued)

*Primary Examiner* — Tan V Mai
(74) *Attorney, Agent, or Firm* — Foley & Lardner LLP

(57) ABSTRACT

Disclosed herein includes a system, a method, and a device for multiply-accumulate operation. In one aspect, an input operand is received by control circuitry. In one aspect, the control circuitry determines a sparsity of the input operand, where the sparsity may indicate whether a value of the input operand has a predetermined value or not. In one aspect, the control circuitry determines a stationarity of the input operand, where the stationarity may indicate whether the value of the input operand changes over one or more clock cycles. In one aspect, the input operand is provided to multiply-accumulate circuitry as an input, according to the determined sparsity and stationarity of the input operand.

19 Claims, 9 Drawing Sheets

(56) References Cited

OTHER PUBLICATIONS

Ivan Ratkovic et al: "A Fully Parameterizable Low Power Design of Vector Fused Multiply-Add Using Active Clock-Gating Techniques", Low Power Electronics and Design, ACM, 2 Penn Plaza, Suite 701 New York NY 10121-0701 USA, Aug. 8, 2016 (Aug. 8, 2016), pp. 362-367.
Peluso Valentino et al: "Weak-MAC: Arithmetic Relaxation for Dynamic Energy-Accuracy Scaling in ConvNets", 2018 IEEE International Symposium on Circuits and Systems (ISCAS), IEEE, May 27, 2018 {May 27, 2018), pp. 1-5.
Preeti Ranjan Panda et al: "Power-efficient System Design" In: "Power-efficient System Design", Sep. 17, 2010 {Sep. 17, 2010), Springer, XP055737759, ISBN: 978-1-4899-7352-8 pp. 73-75.

\* cited by examiner

POWER EFFICIENT MULTIPLY-ACCUMULATE CIRCUITRY

FIELD OF DISCLOSURE

The present disclosure is generally related to multiply-accumulate (MAC) circuitry, including but not limited to reducing power consumption of the MAC circuitry based on a sparsity and/or stationarity of input operands of the MAC circuitry.

BACKGROUND

MAC circuitry performs central computations for a neural network. In one example, the MAC circuitry models a node or a neuron of a neural network, and computes a dot product of two input vectors corresponding to, for example, weights and activation values. Computing a dot product involves multiplying weights with corresponding activation values and adding the multiplication results, which may be computationally exhaustive. In one aspect, a neural network having a large number of nodes or neurons implements a large network of MAC circuitries, which may demand or consume a significant amount of power.

SUMMARY

Various embodiments disclosed herein are related to a method for a multiply-accumulate operation. In some embodiments, the method includes receiving, by control circuitry, an input operand. In some embodiments, the method includes determining, by the control circuitry, a sparsity of the input operand, where the sparsity may indicate whether a value of the input operand has a predetermined value or not. In some embodiments, the method includes determining by the control circuitry, a stationarity of the input operand, where the stationarity may indicate whether the value of the input operand remains unchanged for a predetermined number of clock cycles. In some embodiments, the method includes providing the input operand to multiply-accumulate circuitry as an input, according to the determined sparsity and stationarity of the input operand.

Various embodiments disclosed herein are related to a device for a multiply-accumulate operation. In some embodiments, the device includes multiplier and accumulator (MAC) circuitry including a first input to receive a first operand for a neural network computation, a second input to receive a second operand for the neural network computation, a third input to receive an accumulated data for the neural network computation, and an output to provide a summation of i) a multiplication of the first operand and the second operand, and ii) the accumulated data. In some embodiments, the device includes an accumulation register including a first input to receive the summation from the output of the MAC circuitry, a second input to receive a control signal indicating whether both values of the first operand and the second operand are non-zero, and an output to provide the summation to the third input of the MAC circuitry, in response to the control signal indicating that both the values of the first operand and the second operand are non-zero. In some embodiments, the accumulation register is configured to bypass providing the summation to the third input of the MAC circuitry, in response to the control signal indicating that at least one of a first value of the first operand or a second value of the second operand is zero. In some embodiments, the first operand includes a weight for the neural network computation and the second operand includes an activation value for the neural network computation.

In some embodiments, the device further includes logic circuitry configured to perform an AND logic operation on a first signal and a second signal to generate the control signal. The first signal may indicate whether a first value of the first operand is non-zero and the second signal may indicate whether a second value of the second operand is non-zero. In some embodiments, the device further includes a first input register including an output to provide the first operand to the first input of the MAC circuitry, in response to at least one of i) the first signal indicating that the first value of the first operand is non-zero, or ii) a third signal indicating that the first value of the first operand has changed.

In some embodiments, the device further includes a second input register including an output to provide the second operand to the second input of the MAC circuitry, in response to at least one of i) the second signal indicating that the second value of the second operand is non-zero or ii) a fourth signal indicating that the second value of the second operand has changed. In some embodiments, the device further includes control circuitry configured to compare the first value of the first operand at a clock cycle and a third value of the first operand at a previous clock cycle, and generate the third signal indicating that the first value of the first operand has changed, in response to the first value of the first operand at the clock cycle and the third value of the first operand at the previous clock cycle being different. In some embodiments, the control circuitry is further configured to compare the second value of the second operand at the clock cycle and a fourth value of the second operand at the previous clock cycle, and generate the fourth signal indicating that the second value of the second operand has changed, in response to the second value of the second operand at the clock cycle and the fourth value of the second operand at the previous clock cycle being different.

In some embodiments, the device further includes additional logic circuitry configured to perform an OR logic operation on the first signal and the third signal to generate another control signal, and provide the another control signal to the first input register. The first input register may be configured to provide the first operand to the first input of the MAC circuitry, in response to the another control signal being non-zero. In some embodiments, the device further includes control circuitry coupled to the additional logic circuitry. The control circuitry may be configured to generate the first signal and provide the first signal to the additional logic circuitry.

Various embodiments disclosed herein are related to a method for multiply-accumulate operation. In some embodiments, the method includes receiving, by multiplier and accumulator (MAC) circuitry, a first operand for a neural network computation, a second operand for the neural network computation, and an accumulated data for the neural network computation. In some embodiments, the method includes providing, by the MAC circuitry, a summation of i) a multiplication of the first operand and the second operand, and ii) the accumulated data. In some embodiments, the method includes receiving, by an accumulation register, the summation from the MAC circuitry. In some embodiments, the method includes receiving, by the accumulation register, a control signal indicating whether both values of the first operand and the second operand are non-zero. In some embodiments, the method includes providing, by the accumulation register, the summation to the MAC circuitry, in response to the control signal indicating that both the values of the first operand and the second operand are non-zero. In some embodiments, the method includes bypassing, by the accumulation register, providing the summation to the MAC circuitry, in response to the control signal indicating that at least one of a first value of the first operand or a second value of the second operand is zero. The first operand may include a weight for the neural network computation and the second operand may include an activation value for the neural network computation.

In some embodiments, the method includes performing, by logic circuitry, an AND logic operation on a first signal and a second signal to generate the control signal. The first signal may indicate whether a first value of the first operand is non-zero and the second signal may indicate whether a second value of the second operand is non-zero. In some embodiments, the method includes providing, by a first input register, the first operand to the MAC circuitry, in response to at least one of i) the first signal indicating that the first value of the first operand is non-zero, or ii) a third signal indicating that the first value of the first operand has changed. In some embodiments, the method includes providing, by a second input register, the second operand to the MAC circuitry, in response to at least one of i) the second signal indicating that the second value of the second operand is non-zero or ii) a fourth signal indicating that the second value of the second operand has changed. In some embodiments, the method includes comparing, by control circuitry, the first value of the first operand at a clock cycle and a third value of the first operand at a previous clock cycle. In some embodiments, the method includes generating, by the control circuitry, the third signal indicating that the first value of the first operand has changed, in response to the first value of the first operand at the clock cycle and the third value of the first operand at the previous clock cycle being different.

In some embodiments, the method includes comparing, by the control circuitry, the second value of the second operand at the clock cycle and a fourth value of the second operand at the previous clock cycle. In some embodiments, the method includes generating, by the control circuitry, the fourth signal indicating that the second value of the second operand has changed, in response to the second value of the second operand at the clock cycle and the fourth value of the second operand at the previous clock cycle being different. In some embodiments, the method includes performing, by additional logic circuitry, an OR logic operation on the first signal and the third signal to generate another control signal. In some embodiments, the method includes providing, by the additional logic circuitry, the another control signal to the first input register. The first input register may be configured to provide the first operand to the first input of the MAC circuitry, in response to the another control signal being non-zero. In some embodiments, the method includes generating, by control circuitry coupled to the additional logic circuitry, the first signal, and providing, by the control circuitry, the first signal to the additional logic circuitry.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes an environment, system, configuration and/or other aspects useful for practicing or implementing an embodiment of the present systems, methods and devices; and Section B describes embodiments of devices, systems and methods for operating the MAC circuitry based on a sparsity and/or stationarity of input operands of the MAC circuitry.

A. Environment for Artificial Intelligence Related Processing

Figure 1A:
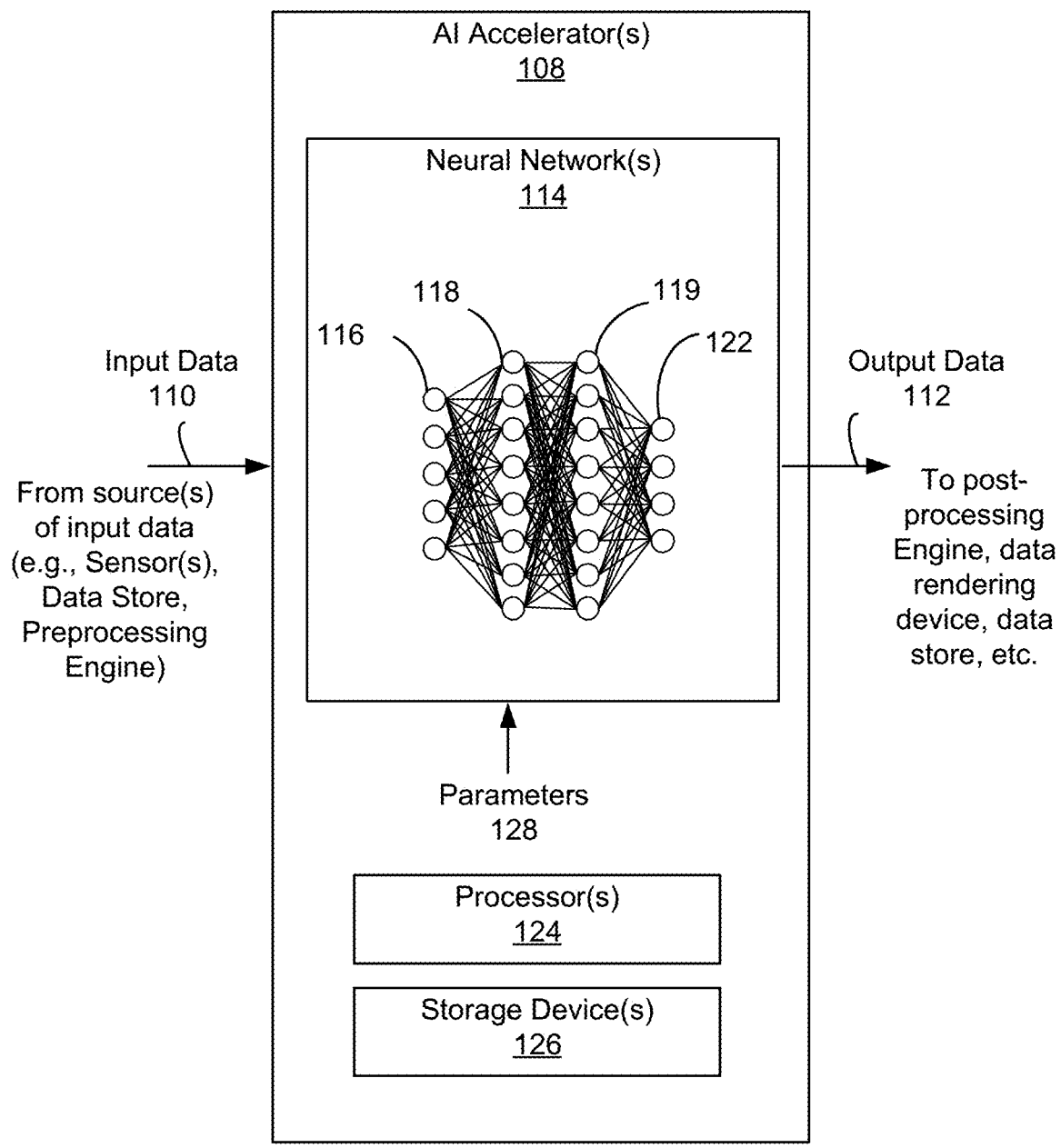
FIG. 1A is a block diagram of an embodiment of a system for performing artificial intelligence (AI) related processing, according to an example implementation of the present disclosure.

Prior to discussing the specifics of embodiments of systems, devices and/or methods in Section B, it may be helpful to discuss the environments, systems, configurations and/or other aspects useful for practicing or implementing certain embodiments of the systems, devices and/or methods. Referring now to FIG. 1A, an embodiment of a system for performing artificial intelligence (AI) related processing is depicted. In brief overview, the system includes one or more AI accelerators 108 that can perform AI related processing using input data 110. Although referenced as an AI accelerator 108, it is sometimes referred as a neural network accelerator (NNA), neural network chip or hardware, AI processor, AI chip, etc. The AI accelerator(s) 108 can perform AI related processing to output or provide output data 112, according to the input data 110 and/or parameters 128 (e.g., weight and/or bias information). An AI accelerator 108 can include and/or implement one or more neural networks 114 (e.g., artificial neural networks), one or more processor(s) 24 and/or one or more storage devices 126.

Each of the above-mentioned elements or components is implemented in hardware, or a combination of hardware and software. For instance, each of these elements or components can include any application, program, library, script, task, service, process or any type and form of executable instructions executing on hardware such as circuitry that can include digital and/or analog elements (e.g., one or more transistors, logic gates, registers, memory devices, resistive elements, conductive elements, capacitive elements).

The input data 110 can include any type or form of data for configuring, tuning, training and/or activating a neural network 114 of the AI accelerator(s) 108, and/or for processing by the processor(s) 124. The neural network 114 is sometimes referred to as an artificial neural network (ANN). Configuring, tuning and/or training a neural network can refer to or include a process of machine learning in which training data sets (e.g., as the input data 110) such as historical data are provided to the neural network for processing. Tuning or configuring can refer to or include training or processing of the neural network 114 to allow the neural network to improve accuracy. Tuning or configuring the neural network 114 can include, for example, designing, forming, building, synthesizing and/or establishing the neural network using architectures that have proven to be successful for the type of problem or objective desired for the neural network 114. In some cases, the one or more neural networks 114 may initiate at a same or similar baseline model, but during the tuning, training or learning process, the results of the neural networks 114 can be sufficiently different such that each neural network 114 can be tuned to process a specific type of input and generate a specific type of output with a higher level of accuracy and reliability as compared to a different neural network that is either at the baseline model or tuned or trained for a different objective or purpose. Tuning the neural network 114 can include setting different parameters 128 for each neural network 114, fine-tuning the parameters 128 differently for each neural network 114, or assigning different weights (e.g., hyperparameters, or learning rates), tensor flows, etc. Thus, setting appropriate parameters 128 for the neural network(s) 114 based on a tuning or training process and the objective of the neural network(s) and/or the system, can improve performance of the overall system.

A neural network 114 of the AI accelerator 108 can include any type of neural network including, for example, a convolution neural network (CNN), deep convolution network, a feed forward neural network (e.g., multilayer perceptron (MLP)), a deep feed forward neural network, a radial basis function neural network, a Kohonen self-organizing neural network, a recurrent neural network, a modular neural network, a long/short term memory neural network, etc. The neural network(s) 114 can be deployed or used to perform data (e.g., image, audio, video) processing, object or feature recognition, recommender functions, data or image classification, data (e.g., image) analysis, etc., such as natural language processing.

As an example, and in one or more embodiments, the neural network 114 can be configured as or include a convolution neural network. The convolution neural network can include one or more convolution cells (or pooling layers) and kernels, that can each serve a different purpose. The convolution neural network can include, incorporate and/or use a convolution kernel (sometimes simply referred as "kernel"). The convolution kernel can process input data, and the pooling layers can simplify the data, using, for example, non-linear functions such as a max, thereby reducing unnecessary features. The neural network 114 including the convolution neural network can facilitate image, audio or any data recognition or other processing. For example, the input data 110 (e.g., from a sensor) can be passed to convolution layers of the convolution neural network that form a funnel, compressing detected features in the input data 110. The first layer of the convolution neural network can detect first characteristics, the second layer can detect second characteristics, and so on.

The convolution neural network can be a type of deep, feed-forward artificial neural network configured to analyze visual imagery, audio information, and/or any other type or form of input data 110. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other data classification/processing algorithms, the convolution neural network can automatically learn the filters that may be hand-engineered for other data classification/processing algorithms, thereby improving the efficiency associated with configuring, establishing or setting up the neural network 114, thereby providing a technical advantage relative to other data classification/processing techniques.

The neural network 114 can include an input layer 116 and an output layer 122, of neurons or nodes. The neural network 114 can also have one or more hidden layers 118, 119 that can include convolution layers, pooling layers, fully connected layers, and/or normalization layers, of neurons or nodes. In a neural network 114, each neuron can receive input from some number of locations in the previous layer. In a fully connected layer, each neuron can receive input from every element of the previous layer.

Each neuron in a neural network 114 can compute an output value by applying some function to the input values coming from the receptive field in the previous layer. The function that is applied to the input values is specified by a vector of weights and a bias (typically real numbers). Learning (e.g., during a training phase) in a neural network 114 can progress by making incremental adjustments to the biases and/or weights. The vector of weights and the bias can be called a filter and can represent some feature of the input (e.g., a particular shape). A distinguishing feature of convolutional neural networks is that many neurons can share the same filter. This reduces memory footprint because a single bias and a single vector of weights can be used across all receptive fields sharing that filter, rather than each receptive field having its own bias and vector of weights.

For example, in a convolution layer, the system can apply a convolution operation to the input layer 116, passing the result to the next layer. The convolution emulates the response of an individual neuron to input stimuli. Each convolutional neuron can process data only for its receptive field. Using the convolution operation can reduce the number of neurons used in the neural network 114 as compared to a fully connected feedforward neural network. Thus, the convolution operation can reduce the number of free parameters, allowing the network to be deeper with fewer parameters. For example, regardless of an input data (e.g., image data) size, tiling regions of size 5×5, each with the same shared weights, may use only 25 learnable parameters. In this way, the first neural network 114 with a convolution neural network can resolve the vanishing or exploding gradients problem in training traditional multi-layer neural networks with many layers by using backpropagation.

The neural network 114 (e.g., configured with a convolution neural network) can include one or more pooling layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer.

The neural network 114 (e.g., configured with a convolution neural network) can include fully connected layers. Fully connected layers can connect every neuron in one layer to every neuron in another layer. The neural network 114 can be configured with shared weights in convolutional layers, which can refer to the same filter being used for each receptive field in the layer, thereby reducing a memory footprint and improving performance of the first neural network 114.

The hidden layers 118, 119 can include filters that are tuned or configured to detect information based on the input data (e.g., sensor data, from a virtual reality system for instance). As the system steps through each layer in the neural network 114 (e.g., convolution neural network), the system can translate the input from a first layer and output the transformed input to a second layer, and so on. The neural network 114 can include one or more hidden layers 118, 119 based on the type of object or information being detected, processed and/or computed, and the type of input data 110.

In some embodiments, the convolutional layer is the core building block of a neural network 114 (e.g., configured as a CNN). The layer's parameters 128 can include a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the neural network 114 can learn filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map. In a convolutional layer, neurons can receive input from a restricted subarea of the previous layer. Typically, the subarea is of a square shape (e.g., size 5 by 5). The input area of a neuron is called its receptive field. So, in a fully connected layer, the receptive field is the entire previous layer. In a convolutional layer, the receptive area can be smaller than the entire previous layer.

The first neural network 114 can be trained to detect, classify, segment and/or translate input data 110 (e.g., by detecting or determining the probabilities of objects, events, words and/or other features, based on the input data 110). For example, the first input layer 116 of neural network 114 can receive the input data 110, process the input data 110 to transform the data to a first intermediate output, and forward the first intermediate output to a first hidden layer 118. The first hidden layer 118 can receive the first intermediate output, process the first intermediate output to transform the first intermediate output to a second intermediate output, and forward the second intermediate output to a second hidden layer 119. The second hidden layer 119 can receive the second intermediate output, process the second intermediate output to transform the second intermediate output to a third intermediate output, and forward the third intermediate output to an output layer 122 for example. The output layer 122 can receive the third intermediate output, process the third intermediate output to transform the third intermediate output to output data 112, and forward the output data 112 (e.g., possibly to a post-processing engine, for rendering to a user, for storage, and so on). The output data 112 can include object detection data, enhanced/translated/augmented data, a recommendation, a classification, and/or segmented data, as examples.

Referring again to FIG. 1A, the AI accelerator 108 can include one or more storage devices 126. A storage device 126 can be designed or implemented to store, hold or maintain any type or form of data associated with the AI accelerator(s) 108. For example, the data can include the input data 110 that is received by the AI accelerator(s) 108, and/or the output data 112 (e.g., before being output to a next device or processing stage). The data can include intermediate data used for, or from any of the processing stages of a neural network(s) 114 and/or the processor(s) 124. The data can include one or more operands for input to and processing at a neuron of the neural network(s) 114, which can be read or accessed from the storage device 126. For example, the data can include input data, weight information and/or bias information, activation function information, and/or parameters 128 for one or more neurons (or nodes) and/or layers of the neural network(s) 114, which can be stored in and read or accessed from the storage device 126. The data can include output data from a neuron of the neural network(s) 114, which can be written to and stored at the storage device 126. For example, the data can include activation data, refined or updated data (e.g., weight information and/or bias information from a training phase for example, activation function information, and/or other parameters 128) for one or more neurons (or nodes) and/or layers of the neural network(s) 114, which can be transferred or written to, and stored in the storage device 126.

In some embodiments, the AI accelerator 108 can include one or more processors 124. The one or more processors 124 can include any logic, circuitry and/or processing component (e.g., a microprocessor) for pre-processing input data for any one or more of the neural network(s) 114 or AI accelerator(s) 108, and/or for post-processing output data for any one or more of the neural network(s) 114 or AI accelerator(s) 108. The one or more processors 124 can provide logic, circuitry, processing component and/or functionality for configuring, controlling and/or managing one or more operations of the neural network(s) 114 or AI accelerator(s) 108. For instance, a processor 124 may receive data or signals associated with a neural network 114 to control or reduce power consumption (e.g., via clock-gating controls on circuitry implementing operations of the neural network 114). As another example, a processor 124 may partition and/or re-arrange data for separate processing (e.g., at various components of an AI accelerator 108, in parallel for example), sequential processing (e.g., on the same component of an AI accelerator 108, at different times or stages), or for storage in different memory slices of a storage device, or in different storage devices. In some embodiments, the processor(s) 124 can configure a neural network 114 to operate for a particular context, provide a certain type of processing, and/or to address a specific type of input data, e.g., by identifying, selecting and/or loading specific weight, activation function and/or parameter information to neurons and/or layers of the neural network 114.

In some embodiments, the AI accelerator 108 is designed and/or implemented to handle or process deep learning and/or AI workloads. For example, the AI accelerator 108 can provide hardware acceleration for artificial intelligence applications, including artificial neural networks, machine vision and machine learning. The AI accelerator 108 can be configured for operation to handle robotics related, internet of things (IoT) related, and other data-intensive or sensor-driven tasks. The AI accelerator 108 may include a multi-core or multiple processing element (PE) design, and can be incorporated into various types and forms of devices such as artificial reality (e.g., virtual, augmented or mixed reality) systems, smartphones, tablets, and computers. Certain embodiments of the AI accelerator 108 can include or be implemented using at least one digital signal processor (DSP), co-processor, microprocessor, computer system, heterogeneous computing configuration of processors, graphics processing unit (GPU), field-programmable gate array (FPGA), and/or application-specific integrated circuit (ASIC). The AI accelerator 108 can be a transistor based, semiconductor based and/or a quantum computing based device.

Figure 1B:
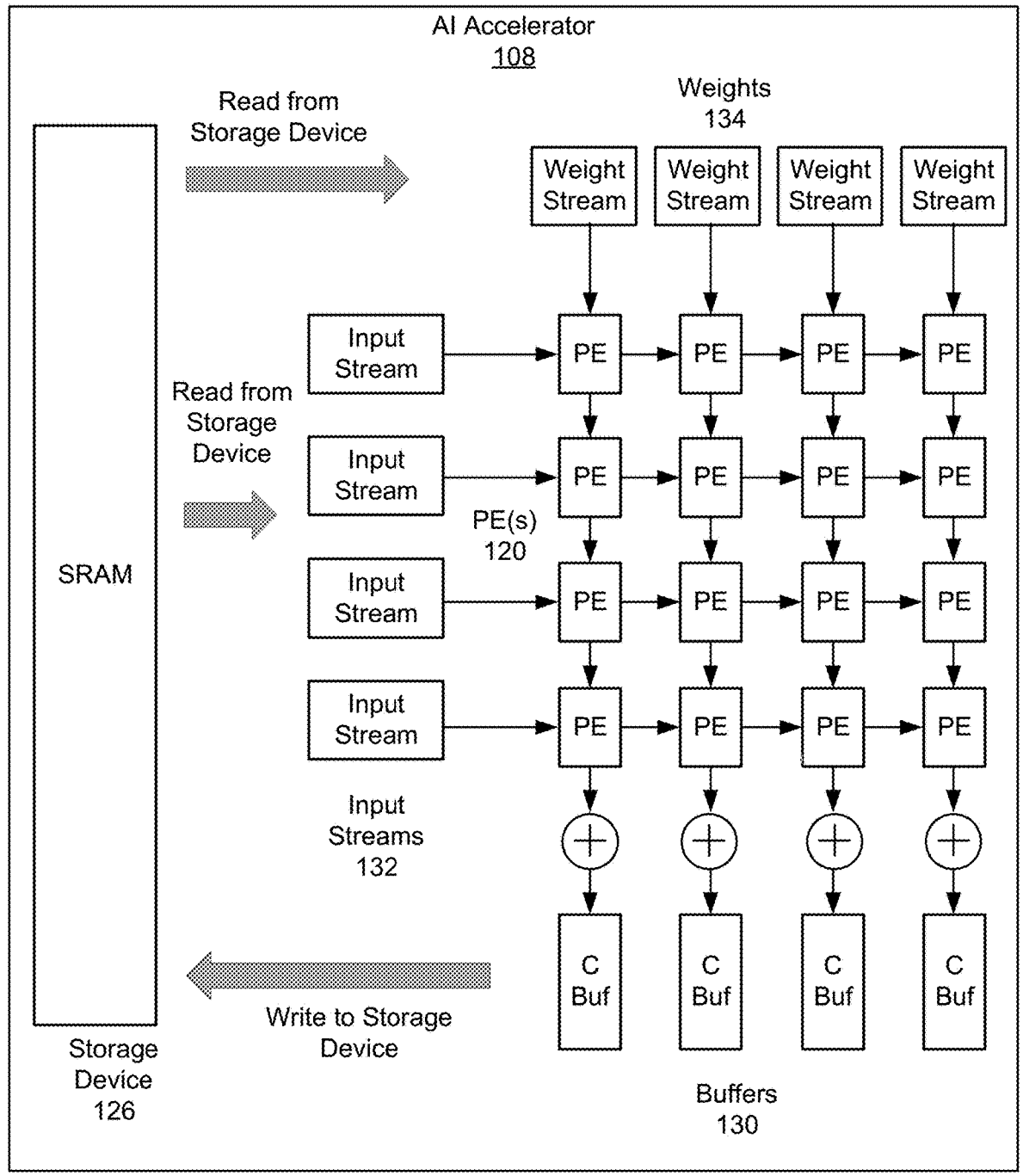
FIG. 1B is a block diagram of an embodiment of a device for performing AI related processing, according to an example implementation of the present disclosure.

Referring now to FIG. 1B, an example embodiment of a device for performing AI related processing is depicted. In brief overview, the device can include or correspond to an AI accelerator 108, e.g., with one or more features described above in connection with FIG. 1A. The AI accelerator 108 can include one or more storage devices 126 (e.g., memory such as a static random-access memory (SRAM) device), one or more buffers, a plurality or array of processing element (PE) circuits, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In a neural network 114 (e.g., artificial neural network) implemented in the AI accelerator 108, neurons can take various forms and can be referred to as processing elements (PEs) or PE circuits. The neuron can be implemented as a corresponding PE circuit, and the processing/activation that can occur at the neuron can be performed at the PE circuit. The PEs are connected into a particular network pattern or array, with different patterns serving different functional purposes. The PE in an artificial neural network operate electrically (e.g., in the embodiment of a semiconductor implementation), and may be either analog, digital, or a hybrid. To parallel the effect of a biological synapse, the connections between PEs can be assigned multiplicative weights, which can be calibrated or "trained" to produce the proper system output.

A PE can be defined in terms of the following equations (e.g., which represent a McCulloch-Pitts model of a neuron):

$$\zeta = \Sigma_i w_i x_i \quad (1)$$

$$y = \sigma(\zeta) \quad (2)$$

Where $\zeta$ is the weighted sum of the inputs (e.g., the inner product of the input vector and the tap-weight vector), and $\sigma(\zeta)$ is a function of the weighted sum. Where the weight and input elements form vectors w and x, the $\zeta$ weighted sum becomes a simple dot product:

$$\zeta = w \cdot x \quad (3)$$

This may be referred to as either the activation function (e.g., in the case of a threshold comparison) or a transfer function. In some embodiments, one or more PEs can be referred to as a dot product engine. The input (e.g., input data 110) to the neural network 114, x, can come from an input space and the output (e.g., output data 112) are part of the output space. For some neural networks, the output space Y may be as simple as {0, 1}, or it may be a complex multi-dimensional (e.g., multiple channel) space (e.g., for a convolutional neural network). Neural networks tend to have one input per degree of freedom in the input space, and one output per degree of freedom in the output space.

In some embodiments, the PEs can be arranged and/or implemented as a systolic array. A systolic array can be a network (e.g., a homogeneous network) of coupled data processing units (DPUs) such as PEs, called cells or nodes. Each node or PE can independently compute a partial result as a function of the data received from its upstream neighbors, can store the result within itself and can pass the result downstream for instance. The systolic array can be hardwired or software configured for a specific application. The nodes or PEs can be fixed and identical, and interconnect of the systolic array can be programmable. Systolic arrays can rely on synchronous data transfers.

Referring again to FIG. 1B, the input x to a PE 120 can be part of an input stream 132 that is read or accessed from a storage device 126 (e.g., SRAM). An input stream 132 can be directed to one row (horizontal bank or group) of PEs, and can be shared across one or more of the PEs, or partitioned into data portions (overlapping or non-overlapping data portions) as inputs for respective PEs. Weights 134 (or weight information) in a weight stream (e.g., read from the storage device 126) can be directed or provided to a column (vertical bank or group) of PEs. Each of the PEs in the column may share the same weight 134 or receive a corresponding weight 134. The input and/or weight for each target PE can be directly routed (e.g., from the storage device 126) to the target PE (e.g., without passing through other PE(s)), or can be routed through one or more PEs (e.g., along a row or column of PEs) to the target PE. The output of each PE can be routed directly out of the PE array (e.g., without passing through other PE(s)), or can be routed through one or more PEs (e.g., along a column of PEs) to exit the PE array. The outputs of each column of PEs can be summed or added at an adder circuitry of the respective column, and provided to a buffer 130 for the respective column of PEs. The buffer(s) 130 can provide, transfer, route, write and/or store the received outputs to the storage device 126. In some embodiments, the outputs (e.g., activation data from one layer of the neural network) that are stored by the storage device 126 can be retrieved or read from the storage device 126, and be used as inputs to the array of PEs 120 for processing (of a subsequent layer of the neural network) at a later time. In certain embodiments, the outputs that are stored by the storage device 126 can be retrieved or read from the storage device 126 as output data 112 for the AI accelerator 108.

Figure 1C:
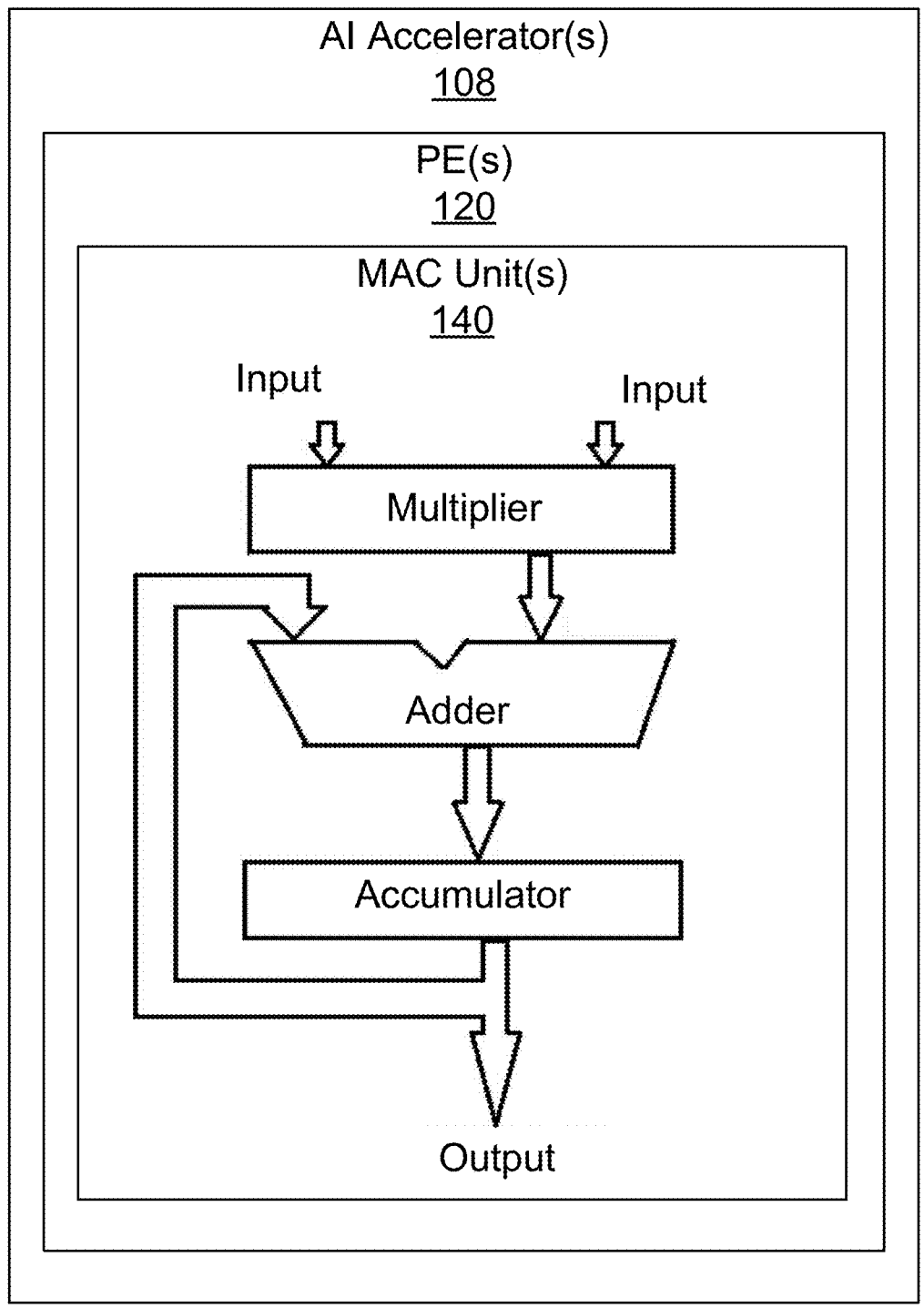
FIG. 1C is a block diagram of an embodiment of a device for performing AI related processing, according to an example implementation of the present disclosure.

Referring now to FIG. 1C, one example embodiment of a device for performing AI related processing is depicted. In brief overview, the device can include or correspond to an AI accelerator 108, e.g., with one or more features described above in connection with FIGS. 1A and 1B. The AI accelerator 108 can include one or more PEs 120, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In some embodiments, a PE 120 can include one or more multiply-accumulate (MAC) units or circuitry 140. One or more PEs can sometimes be referred to (singly or collectively) as a MAC engine. A MAC unit is configured to perform multiply-accumulate operation(s). The MAC unit can include a multiplier circuit, an adder circuit and/or an accumulator circuit. The multiply-accumulate operation computes the product of two numbers and adds that product to an accumulator. The MAC operation can be represented as follows, in connection with an accumulator operand a, and inputs b and c:

$$a \leftarrow a + (b \times c) \quad (4)$$

In some embodiments, a MAC unit 140 may include a multiplier implemented in combinational logic followed by an adder (e.g., that includes combinational logic) and an accumulator register (e.g., that includes sequential and/or combinational logic) that stores the result. The output of the accumulator register can be fed back to one input of the adder, so that on each clock cycle, the output of the multiplier can be added to the accumulator register.

As discussed above, a MAC unit 140 can perform both multiply and addition functions. The MAC unit 140 can operate in two stages. The MAC unit 140 can first compute the product of given numbers (inputs) in a first stage, and forward the result for the second stage operation (e.g., addition and/or accumulate). An n-bit MAC unit 140 can include an n-bit multiplier, 2n-bit adder, and 2n-bit accumulator. An array or plurality of MAC units 140 (e.g., in PEs) can be arranged in a systolic array, for parallel integration, convolution, correlation, matrix multiplication, data sorting, and/or data analysis tasks.

Figure 1D:
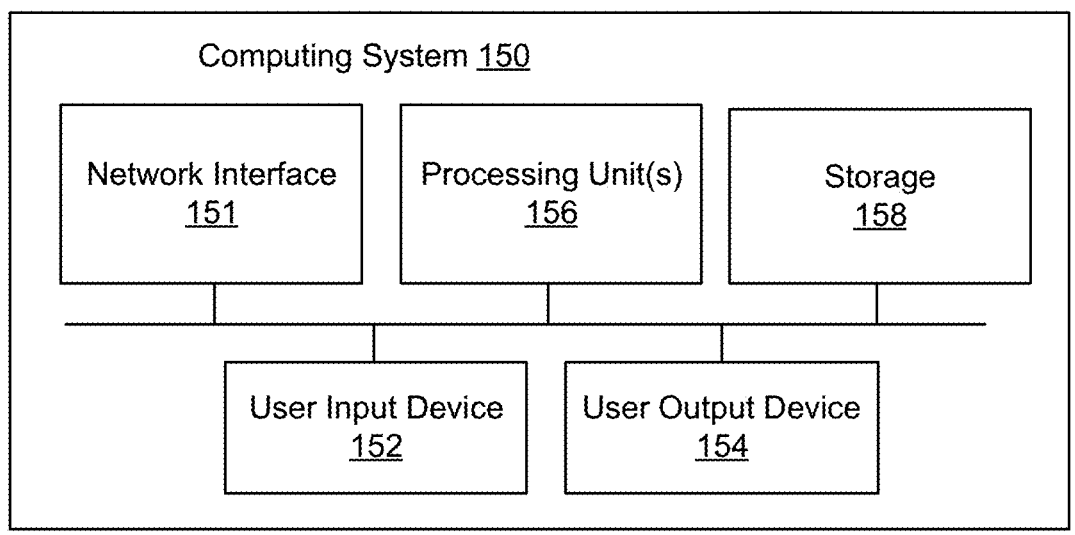
FIG. 1D is a block diagram of a computing environment according to an example implementation of the present disclosure.

Various systems and/or devices described herein can be implemented in a computing system. FIG. 1D shows a block diagram of a representative computing system 150. In some embodiments, the system of FIG. 1A can form at least part of the processing unit(s) 156 (or processors 156) of the computing system 150. Computing system 150 can be implemented, for example, as a device (e.g., consumer device) such as a smartphone, other mobile phone, tablet computer, wearable computing device (e.g., smart watch, eyeglasses, head mounted display), desktop computer, laptop computer, or implemented with distributed computing devices. The computing system 150 can be implemented to provide VR, AR, MR experience. In some embodiments, the computing system 150 can include conventional, specialized or custom computer components such as processors 156, storage device 158, network interface 151, user input device 152, and user output device 154.

Network interface 151 can provide a connection to a local/wide area network (e.g., the Internet) to which network interface of a (local/remote) server or back-end system is also connected. Network interface 151 can include a wired interface (e.g., Ethernet) and/or a wireless interface implementing various RF data communication standards such as Wi-Fi, Bluetooth, or cellular data network standards (e.g., 3G, 4G, 5G, LTE, etc.).

User input device 152 can include any device (or devices) via which a user can provide signals to computing system 150; computing system 150 can interpret the signals as indicative of particular user requests or information. User input device 152 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 154 can include any device via which computing system 150 can provide information to a user. For example, user output device 154 can include a display to display images generated by or delivered to computing system 150. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. User output devices 154 can be provided in addition to or instead of a display. Examples include indicator lights, speakers, tactile "display" devices, printers, and so on.

Some implementations include electronic components, such as microprocessors, storage and memory that store computer program instructions in a non-transitory computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 156 can provide various functionality for computing system 150, including any of the functionality described herein as being performed by a server or client, or other functionality associated with message management services.

It will be appreciated that computing system 150 is illustrative and that variations and modifications are possible. Computer systems used in connection with the present disclosure can have other capabilities not specifically described here. Further, while computing system 150 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

B. Methods and Devices for Operating MAC Circuitry Based on a Sparsity and Stationarity of Input Operands Disclosed herein include embodiments of a system, a method, and a device for reducing power consumption of MAC circuitry based on a sparsity and/or stationarity of input operands (or input data) of the MAC circuitry. In one aspect, a sparsity of an input operand indicates whether a value of the input operand has a predetermined value or not (e.g., a value of '0' or not). In one aspect, a stationarity of an input operand may indicate whether a value of the input operand remains unchanged over a period of time (e.g., for a predetermined number of clock cycles). In one approach, a value of an operand register providing an input operand to the MAC circuitry may be updated, in response to the input operand (e.g., weight or activation value represented in an integer representation or a decimal representation) not being stationary (e.g., value of the input operand changes within a predetermined number of clock cycles), in response to the input operand (e.g., weight or activation value) not being sparse (e.g., value of the input operand is not a predetermined value, such as '0'), or in response to both. The value of the operand register may be maintained, if the input operand is stationary (e.g., value of the input operand does not change for a predetermined number of clock cycles) and the input operand is sparse (e.g., value of the input operand is '0').

In one aspect, accumulated data provided to a feedback input of the MAC circuitry is maintained or updated to disable or enable accumulation, according to a sparsity of a first input operand and a sparsity of a second input operand. For example, the accumulated data is changed or updated according to an output of the MAC circuitry and provided to a feedback input of the MAC circuitry to enable accumulation, in response to both the first input operand and the second input operand not being sparse (e.g., having non-zero values). For example, the accumulated data provided to the feedback input of the MAC circuitry 140 can be held or maintained, and continued to be provided to the feedback input of the MAC circuitry 140 without an update to disable accumulation, in response to at least one of the first input operand or the second input operand being sparse (e.g., having a zero value).

In one aspect, an input operand is provided to an input of the MAC circuitry to load the MAC circuitry with the input operand, according to a stationarity of the input operand. For example, the input operand is provided to the input of the MAC circuitry, in response to the input operand not being stationary (e.g., the input operand changes within a predetermined number of clock cycles). For example, the input operand is provided to the input of the MAC circuitry for a first clock cycle, and after that the provided input operand is maintained at the input of the MAC circuitry in response to the input operand being stationary (e.g., the input operand does not change for a predetermined number of clock cycles).

Advantageously, the disclosed system, method and device allow power consumption due to multiply-accumulate operations to be reduced by reducing a number of toggles or changes in inputs to the MAC circuitry. In one aspect, accumulated data feedback to the MAC circuitry may be maintained or kept unchanged, if an input operand is stationary (or the input operand has a zero value), because the input operand being sparse (or having the zero value) does not affect or change the output of the MAC circuitry. In another aspect, an input to the MAC circuitry may be maintained or kept unchanged, if the input operand is stationary (or the value of the input operand is not changed for a predetermined number of clock cycles). Accordingly, a number of toggles by the MAC circuitry for multiplications or accumulations can be reduced to achieve power savings.

Figure 2:
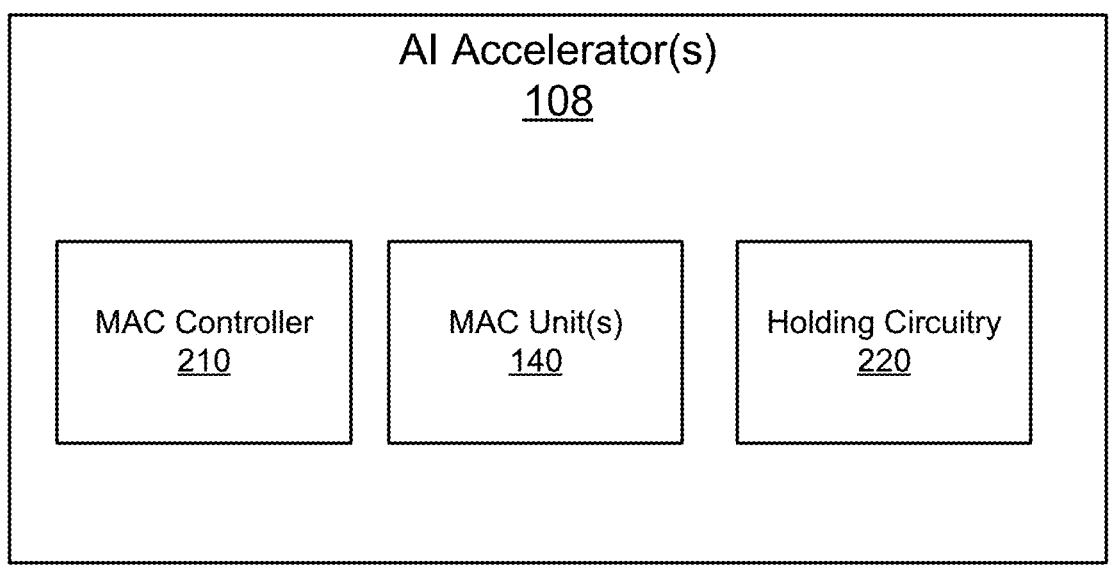
FIG. 2 is a block diagram of an AI accelerator with circuitries for improving power efficiency of multiply-accumulate (MAC) circuitry, according to an example implementation of the present disclosure.

Referring to FIG. 2, illustrated is a block diagram of the AI accelerator 108 with circuitries for improving power efficiency of multiply-accumulate (MAC) circuitry, according to an example implementation of the present disclosure. In some embodiments, the AI accelerator 108 includes a MAC controller 210, one or more MAC units 140, and/or a holding circuitry 220. These components may operate together to determine, for each input operand, a stationarity and a sparsity, and can perform a multiply-accumulate operation according to the determined stationarity and/or sparsity. In some embodiments, the AI accelerator 108 includes more, fewer, or different components than shown in FIG. 2.

In one aspect, the MAC unit 140 receives two input data or two input operands (e.g. weight and activation value) at input ports and receives accumulated data at a feedback port, then performs multiply-accumulate operations according to the two input operands and the accumulated data. In one aspect, the MAC unit 140 may multiply the two input operands, then add the multiplication result with the accumulated data to generate a summation data. The MAC unit 140 may output the summation data to an accumulation register, by which the accumulated data may be updated to be the summation data and provided to the feedback port of the MAC unit 140.

The MAC controller 210 (also referred to as "control circuitry" herein) can be or include a component that detects, for each input operand, a stationarity, a sparsity or both, and generates one or more control signals for configuring the holding circuitry 220 (e.g., according to the detected sparsity and/or stationarity). An input operand may be a weight or an activation value (or an activation function) of a neural network. In one aspect, a sparsity indicates whether a value of an input operand has a predetermined value (e.g., '0') or not. In one aspect, a stationarity indicates whether the value of an input operand remains unchanged for a predetermined number of clock cycles. According to the sparsity, the stationarity, or both for one or both input operands, the MAC controller 210 may generate one or more control signals for configuring the holding circuitry 220. Example process of generating the control signals is provided below with respect to FIGS. 5 and 6.

The holding circuitry 220 can be or include a component that controls input operands and/or accumulated data provided to the MAC circuitry 140 according to one or more control signals from the MAC controller 210. In one implementation, the holding circuitry 220 includes operand registers coupled to corresponding inputs of the MAC circuitry 140 to provide or hold input operands. The holding circuitry 220 may also include an accumulation register coupled between an output port of the MAC circuitry 140 and a feedback port of the MAC circuitry 140 to update, provide or hold accumulated data provided to the MAC circuitry 140.

In one aspect, the holding circuitry 220 may provide an input operand to an input of the MAC circuitry 140, in response to the input operand (e.g., weight or activation value) not being stationary (e.g., value of the input operand changes within a predetermined number of clock cycles, such as 5, 10, 50 or other predetermined number of clock cycles), in response to the input operand (e.g., weight or activation value) not being sparse (e.g., value of the input operand is not '0'), or in response to both. The holding circuitry 220 may provide the input operand to the input of the MAC circuitry 140 for a first clock cycle, then hold or maintain the provided input operand at the input of the MAC circuitry 140, in response to the input operand being stationary (e.g., value of the input operand does not change for a predetermined number of clock cycles) and the input operand being sparse (e.g., value of the input operand is '0').

In one aspect, the holding circuitry 220 may update accumulated data provided to a feedback input of the MAC circuitry 140 to enable accumulation, according to a sparsity of a first input operand and a sparsity of a second input operand. The holding circuitry 220 may update the accumulated data according to summation output from the MAC circuitry and provide the updated accumulated data to the feedback input of the MAC circuitry to enable accumulation, in response to both the first input operand and the second input operand not being sparse (e.g., having non-zero values). The holding circuitry 220 may hold, or maintain accumulated data provided to the feedback input of the MAC circuitry 140 without an update such that the MAC circuitry 140 may not perform accumulation, in response to at least one of the first input operand or the second input operand being sparse (e.g., having a zero value).

Figure 3:
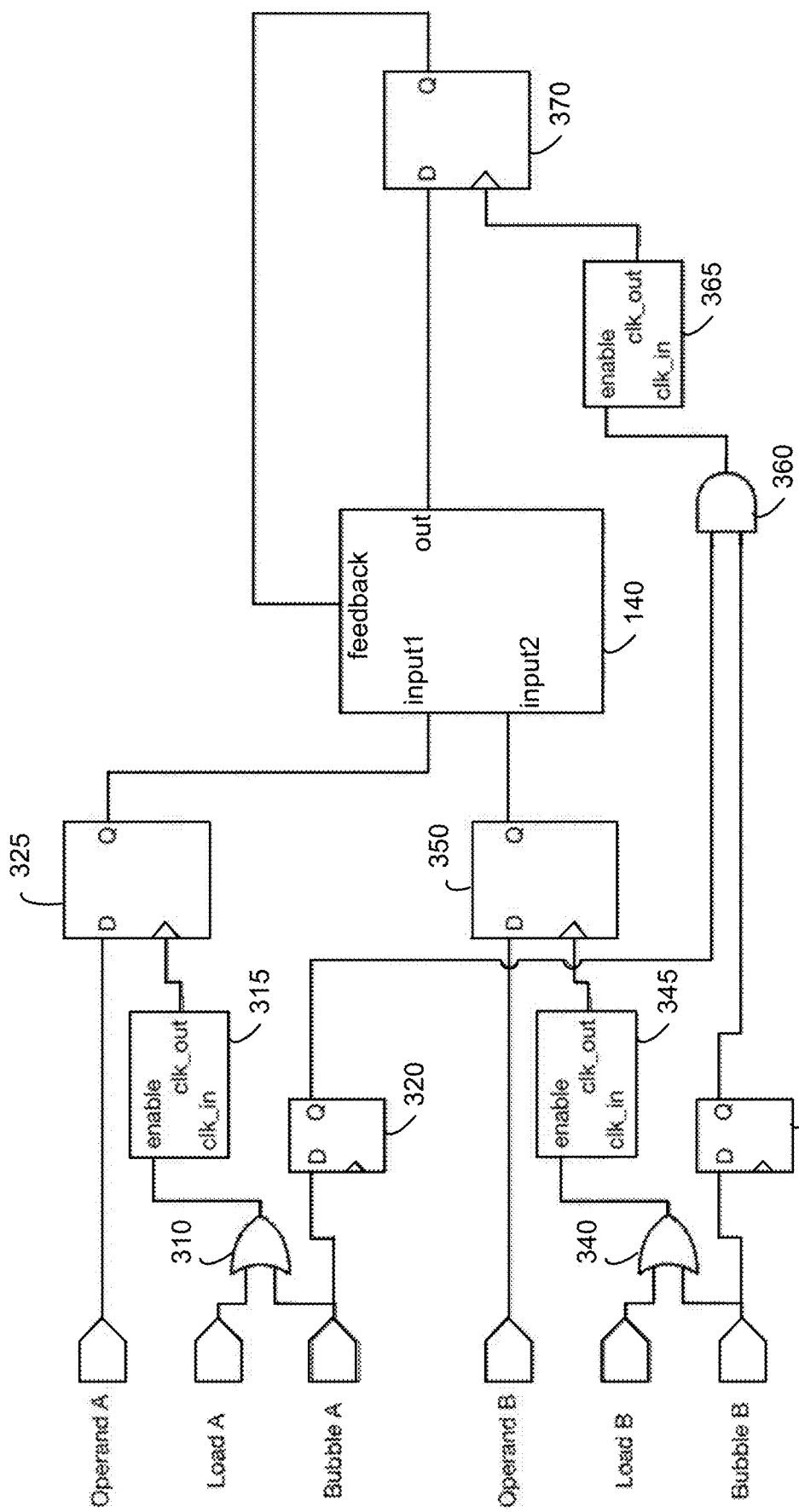
FIG. 3 shows an example circuit diagram of MAC circuitry and additional circuitries to improve power efficiency, according to an example implementation of the present disclosure.

Referring to FIG. 3, illustrated is an example circuit diagram of MAC circuitry and holding circuitry to improve power efficiency, according to an example implementation of the present disclosure. In some embodiments, an AND gate 360, OR gates 310, 340, logic gates 315, 345, 365, registers 320, 325, 350, 355, 370 (or flip flops) constitute the holding circuitry 220 of FIG. 2. The MAC controller 210 may generate the load A signal and the bubble A signal according to the stationarity and sparsity of the input operand A. Similarly, the MAC controller 210 may generate the load B signal and the bubble B signal according to the stationarity and sparsity of the input operand B. In one aspect, the OR gates 310, 340, the logic gates 315, 345, and the registers 325, 350 may operate together to provide the input operand A and the input operand B to the MAC circuitry 140 according to the load A signal, the load B signal, the bubble A signal and the bubble B signal to avoid or reduce unnecessary toggling by the MAC circuitry 140. Similarly, in one aspect, the AND gate 360, the registers 320, 355, 370, and the logic gate 365 may operate together to update and provide the accumulated data to the feedback port of the MAC circuitry 140 or maintain the accumulated data to avoid unnecessary toggling by the MAC circuitry 140. In some embodiments, the holding circuitry may include additional, fewer, or different components than shown in FIG. 3.

In one configuration, the OR gate 310 includes a first input port to receive the load A signal, a second input port to receive the bubble A signal, and an output port coupled to an enable port of the logic gate 315. The OR gate 310 may perform an OR logic operation on the load A signal and the bubble A signal to provide the result of the OR logic operation between the load A signal and the bubble A signal to the logic gate 315. For example, the output port of the OR gate 310 provides, transmits, or outputs a logic value '1', in response to the load A signal, the bubble A signal, or both having a logic value '1'. For example, the output port of the OR gate 310 provides, transmits, or outputs a logic value '0', in response to both the load A signal and the bubble A signal having a logic value '0'.

In one configuration, the logic gate 315 includes the enable port coupled to the output port of the OR gate 310, a clock input port to receive a clock signal, and a clock output port coupled to a control port of the register 325. The logic gate 315 may be implemented as an integrated clock-gating gate or a transmission gate. In this configuration, the logic gate 315 may pass or provide the clock signal to the register 325 according to the result of the OR logic operation from the OR gate 310. For example, the logic gate 315 provides the clock signal to the register 325, in response to the result of the OR logic operation from the OR gate 310 being logic value '1'. For example, the logic gate 315 does not provide the clock signal to the register 325, in response to the result of the OR logic operation by the OR gate 310 being logic value '0'.

In one configuration, the register 325 includes the control port coupled to the output port of the logic gate 315, an input port to receive the input operand A, and an output port coupled to a first input port of the MAC circuitry 140. In one aspect, the register 325 is implemented as a DQ flip flop. In this configuration, the register 325 may pass or provide the input operand A to the first input port of the MAC circuitry 140, according to the clock signal provided through the logic gate 315. For example, the register 325 provides the input operand A to the first input port of the MAC circuitry 140, in response to a rising edge at the output port of the logic gate 315. For example, in one or more embodiments, the register 325 keeps, holds, or maintains a previous input operand A provided to the first input port of the MAC circuitry 140 regardless of the input operand A at the input port of the register 325, in response to a lack of rising edge at the output port of the logic gate 315.

In one configuration, the OR gate 340 includes a first input port to receive the load B signal, a second input port to receive the bubble B signal, and an output port coupled to an enable port of the logic gate 345. The OR gate 340 may perform an OR logic operation on the load B signal and the bubble B signal to provide the result of the OR logic operation between the load B signal and the bubble B signal to the logic gate 345. For example, the output port of the OR gate 340 provides, transmits, or outputs a logic value '1', in response to the load B signal, the bubble B signal, or both having a logic value '1'. For example, the output port of the OR gate 340 provides transmits, or outputs a logic value '0', in response to both the load B signal and the bubble B signal having a logic value '0'.

In one configuration, the logic gate 345 includes the enable port coupled to the output port of the OR gate 340, a clock input port to receive a clock signal, and a clock output port coupled to a control port of the register 350. The logic gate 345 may be implemented as an integrated clock-gating gate or a transmission gate. In this configuration, the logic gate 345 may pass or provide the clock signal to the register 350 according to the result of the OR logic operation from the OR gate 340. For example, the logic gate 345 provides the clock signal to the register 350, in response to the result of the OR logic operation from the OR gate 340 being logic value '1'. For example, the logic gate 345 does not provide the clock signal to the register 350, in response to the result of the OR logic operation by the OR gate 340 being logic value '0'.

In one configuration, the register 350 includes the control port coupled to the output port of the logic gate 345, an input port to receive the input operand B and an output port coupled to a second input port of the MAC circuitry 140. In one aspect, the register 350 is implemented as a DQ flip flop. In this configuration, the register 350 may pass or provide the input operand B to the second input port of the MAC circuitry 140, according to the clock signal provided through the logic gate 345. For example, the register 350 provides the input operand B to the second input port of the MAC circuitry 140, in response to a rising edge at the output port of the transmission gate 345. For example, and in one or more embodiments, the register 350 keeps, holds, or maintains a previous input operand B provided to the second input port of the MAC circuitry 140 regardless of the input operand B at the input port of the register 350, in response to a lack of rising edge at the output port of the logic gate 345.

In one configuration, the register 320 includes the control port to receive the clock signal, an input port to receive the bubble A signal and an output port coupled to a first input port of the AND gate 360. In one aspect, the register 320 is implemented as a DQ flip flop. In this configuration, the register 320 may pass or provide the bubble A signal to the first input port of the AND gate 360, according to the clock signal received at the control port. For example, the register 320 provides the input operand A to the first input port of the AND gate 360, in response to a rising edge of the clock signal. For example, and in some embodiments, the register 320 keeps, holds, or maintains a previous bubble A signal provided to the first input port of the AND gate 360 regardless of the bubble A signal at the input port of the register 320, in response to a lack of rising edge of the clock signal.

In one configuration, the register 355 includes the control port to receive the clock signal, an input port to receive the bubble B signal and an output port coupled to a second input port of the AND gate 360. In one aspect, the register 355 is implemented as a DQ flip flop. In this configuration, the register 355 may pass or provide the bubble B signal to the second input port of the AND gate 360, according to the clock signal received at the control port. For example, the register 355 provides the input operand B to the second input port of the AND gate 360, in response to a rising edge of the clock signal. For example, the register 355 keeps, holds, or maintains a previous bubble B signal provided to the second input port of the AND gate 360 regardless of the bubble B signal at the input port of the register 355, in response to a lack of rising edge of the clock signal, in certain embodiments.

In one configuration, the AND gate 360 includes the first input port coupled to the output port of the register 320, the second input port coupled to the output port of the register 355, and an output port coupled to an enable port of the logic gate 365. The AND gate 360 may perform an AND logic operation on the output of the register 320 and the output of the register 355 to provide the result of the AND logic operation to the logic gate 365. For example, the output port of the AND gate 360 provides, transmits, or outputs a logic value '1', in response to both the output of the register 320 and the output of the register 355 having a logic value '1'. For example, the output port of the AND gate 360 provides, transmits, or outputs a logic value '0', in response to the output of the register 320, the output of the register 355, or both having a logic value '0'.

In one configuration, the logic gate 365 includes the enable port coupled to the output port of the AND gate 360, a clock input port to receive a clock signal, and a clock output port coupled to a control port of the register 370 (also referred to as "an accumulation register 370"). The logic gate 365 may be implemented as an integrated clock-gating gate or a transmission gate. In this configuration, the logic gate 365 may pass or provide the clock signal to the register 370 according to the result of the AND logic operation from the AND gate 360. For example, the logic gate 365 provides the clock signal to the register 370, in response to the result of the AND logic operation from the AND gate 360 being logic value '1'. For example, the logic gate 365 does not provide the clock signal to the register 370, in response to the result of the AND logic operation by the AND gate 360 being logic value '0'.

In one configuration, the register 370 (also referred to as "an accumulation register 370") includes the control port coupled to the output port of the logic gate 365, an input port coupled to the output port of the MAC circuit 140, and an output port coupled to a feedback port of the MAC circuitry 140. In one aspect, the register 370 is implemented as a DQ flip flop. In this configuration, the register 370 may receive summation data from the output port of the MAC circuitry 140 and provide the accumulated data to the feedback port of the MAC circuitry 140, according to the clock signal received at the control port. For example, the register 370 updates the accumulated data to be the summation data received at the input port of the register 370 and provides the updated accumulated data to the feedback port of the MAC circuitry 140 to allow accumulation, in response to a rising edge at the output of the logic gate 365. For example, the register 370 keeps, holds, or maintains accumulated data provided to the feedback port of the MAC circuitry 140 without an update to the accumulated data regardless of the summation data at the input port of the register 370, in response to a lack of a rising edge at the output of the logic gate 365, in one or more embodiments.

In one aspect, the register 325 may provide an input operand A to a first input of the MAC circuitry 140, according to an output of the logic gate 315. For example, the register 325 may provide an input operand A to a first input of the MAC circuitry 140, in response to the input operand A (e.g., weight or activation value) not being stationary (e.g., value of the input operand changes within a predetermined number of clock cycles), in response to the input operand A (e.g., weight or activation value) not being sparse (e.g., value of the input operand is not '0'), or in response to both.

The holding circuitry 220 may provide the input operand to the input of the MAC circuitry 140 for a first clock cycle, then hold or maintain the provided input operand at the input of the MAC circuitry 140, in response to the input operand being stationary (e.g., value of the input operand does not change for a predetermined number of clock cycles) and the input operand being sparse (e.g., value of the input operand is '0').

In one aspect, the holding circuitry 220 may provide accumulated data to a feedback input of the MAC circuitry 140 to enable accumulation, according to a sparsity of a first input operand and a sparsity of a second input operand. The holding circuitry 220 may receive summation data output from the MAC circuitry 140, update the accumulated data to be the summation data, and provide the updated accumulated data to the feedback port of the MAC circuitry to enable accumulation, in response to both the first input operand and the second input operand not being sparse (e.g., having non-zero values). The holding circuitry 220 may hold, or maintain accumulated data provided to the feedback input of the MAC circuitry 140 without an update irrespective of the summation data from the output port of the MAC circuitry 140 such that the MAC circuitry 140 may not perform accumulation or the accumulated data may remain unchanged, in response to at least one of the first input operand or the second input operand being sparse (e.g., having a zero value).

The MAC circuitry 140 may perform multiplication on input operand A received at its first input port and input operand B received at its second input port. In addition, the MAC circuitry 140 may add the accumulated data received at the feedback port to the multiplication result to generate summation data and provide the summation data to the accumulation register 370.

Figure 4:
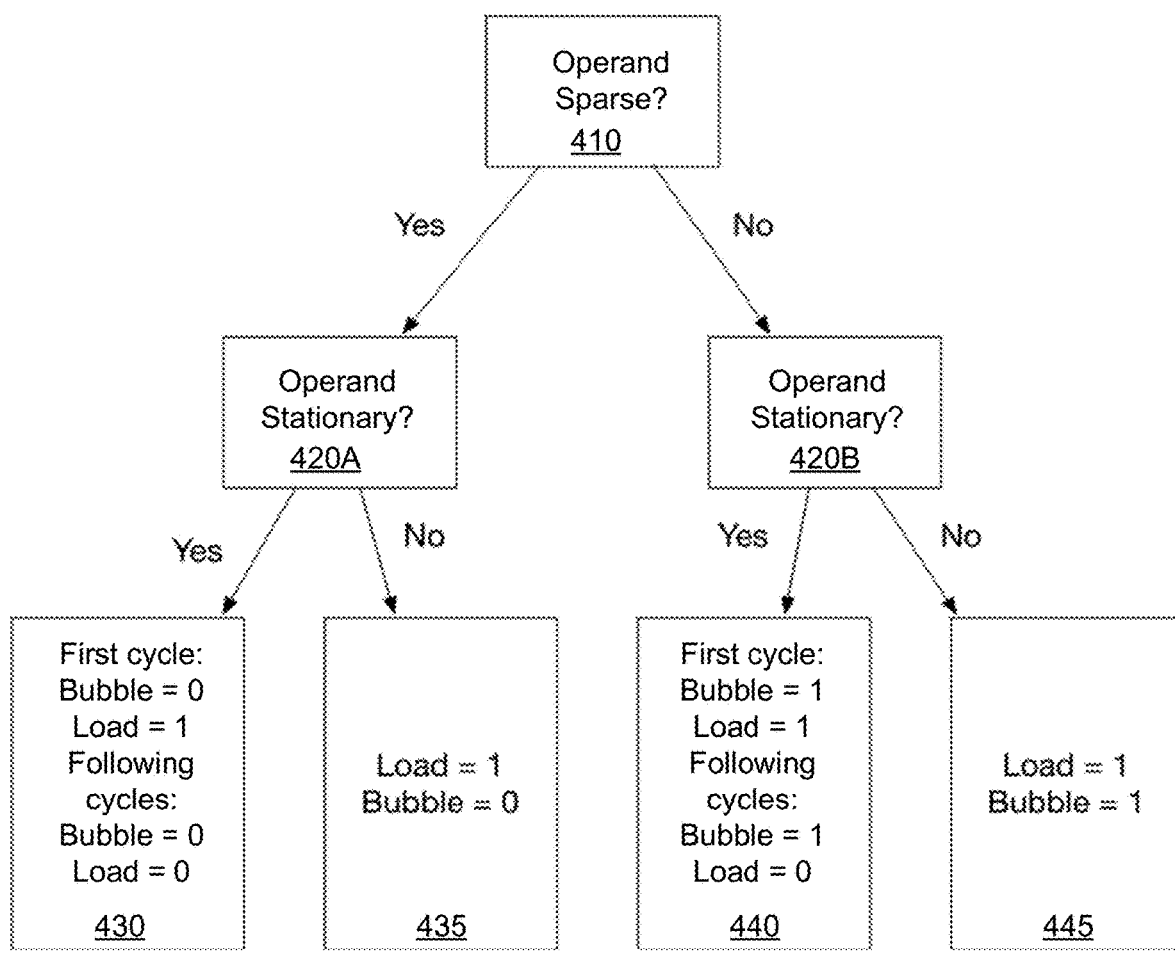
FIG. 4 is a flow chart illustrating a process of generating control signals based on sparsity and stationarity of input operands of the MAC circuitry, according to an example implementation of the present disclosure.

Referring to FIG. 4, illustrated is a flow chart illustrating a process 400 of generating control signals based on sparsity and stationarity of input operands of the MAC circuitry, according to an example implementation of the present disclosure. In some embodiments, the MAC controller 210 generates, for an input operand, the load signal and the bubble signal, and provides the load signal and the bubble signal to circuitries as described above with respect to FIG. 3.

In one approach, the MAC controller 210 determines 410 whether an input operand is sparse or not. For example, the MAC controller 210 determines whether a value of the input operand is '0' or not. If the value of the input operand is '0', the MAC controller 210 may determine that the input operand is sparse. If the value of the input operand is not '0', the MAC controller 210 may determine that the input operand is not sparse.

In one approach, the MAC controller 210 determines 420A, 420B whether the input operand is stationary or not. For example, the MAC controller 210 determines whether a value of the input operand changes within a predetermined number of clock cycles. If the value of the input operand changes within the predetermined number of clock cycles, the MAC controller 210 may determine that the input operand is not stationary. If the value of the input operand remains unchanged for the predetermined number of clock cycles, the MAC controller 210 may determine that the input operand is stationary.

In some embodiments, in response to determining that the input operand is sparse and stationary, the MAC controller 210 generates 430 the bubble signal having logic value '0' and the load signal having logic value '1' for a first clock cycle, then generates the bubble signal having logic value '0' and the load signal having logic value '0' for the following clock cycles until the stationarity ends for instance. In this case, the input of the MAC circuitry 140 may be loaded with the value '0' of the input operand in the first clock cycle according to the load signal having logic value '1'. The input of the MAC circuitry 140 may be maintained in the following clock cycles according to the load signal having logic value '0' until the stationarity ends for instance. Moreover, the accumulation register 370 may keep, hold, or maintain an accumulated data provided to the feedback port of the MAC circuitry 140 without an update regardless of the summation data at the input port of the register 370, in response to the bubble signal having logic value '0' to disable or prevent accumulation by the MAC circuitry 140, in some embodiments.

In some embodiments, in response to determining that the input operand is sparse but is not stationary, the MAC controller 210 generates 435 the bubble signal having logic value '0' and the load signal having logic value '1'. In this case, the input of the MAC circuitry 140 may be loaded with the input operand according to the load signal having logic value '1'. Moreover, the accumulation register 370 may keep, hold, or maintain accumulated data provided to the feedback port of the MAC circuitry 140 without an update regardless of the summation data at the input port of the register 370, in response to the bubble signal having logic value '0' to disable or prevent accumulation by the MAC circuitry 140, in one or more embodiments.

In some embodiments, in response to determining that the input operand is not sparse but is stationary, the MAC controller 210 generates 440 the bubble signal having logic value '1' and the load signal having logic value '1' for a first clock cycle, then generates the bubble signal having logic value '1' and the load signal having logic value '0' for the following clock cycles until the stationarity ends for instance. In this case, the input of the MAC circuitry 140 may be loaded with the value of the input operand in the first clock cycle according to the load signal having logic value '1'. The input of the MAC circuitry 140 may be maintained in the following clock cycles according to the load signal having logic value '0' until the stationarity ends for instance. Moreover, the accumulation register 370 can update the accumulated data to be the summation data from the output of the MAC circuitry 140, and can provide the updated accumulated data to the feedback port of the MAC circuitry 140 to enable accumulation by the MAC circuitry 140, in response to the bubble signal having logic value '1'.

In some embodiments, in response to determining that the input operand is neither sparse nor stationary, the MAC controller 210 generates 445 the bubble signal having logic value '1' and the load signal having logic value '1'. In this case, the input of the MAC circuitry 140 may be loaded with the value of the input operand according to the load signal having logic value '1'. Moreover, the accumulation register 370 may update the accumulated data to be the summation data from the output of the MAC circuitry 140, and provide the updated accumulated data to the feedback port of the MAC circuitry 140 to enable accumulation by the MAC circuitry 140, in response to the bubble signal having logic value '1', in one or more embodiments.

Figure 5:
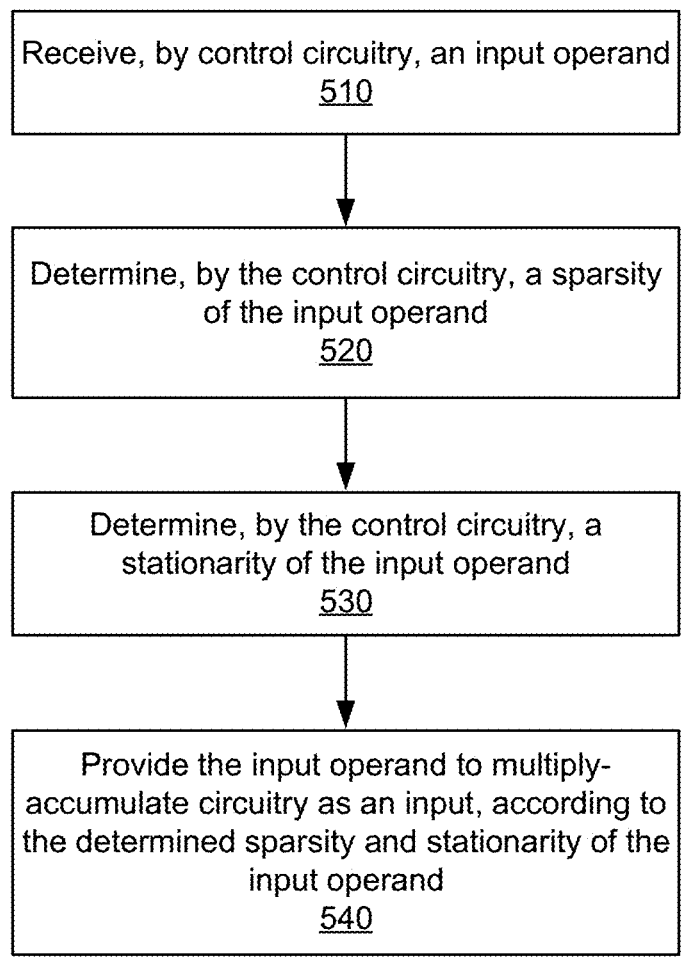
FIG. 5 is a flow chart illustrating a process of operating the MAC circuitry, according to an example implementation of the present disclosure.

Referring to FIG. 5, illustrated is a flow chart illustrating a process 500 of operating the MAC circuitry, according to an example implementation of the present disclosure. In some embodiments, the process 500 is performed by the AI accelerator 108 of FIG. 1C. In other embodiments, the process 500 includes more, fewer, or different steps than shown in FIG. 5.

In one approach, the control circuitry (e.g., MAC controller 210 of FIG. 2) receives 510 an input operand. The input operand may be input data (e.g., weight or activation value) of a neural network. The input operand may be represented in an integer format or a decimal format.

In one approach, the control circuitry determines 520 a sparsity of the input operand. In one aspect, a sparsity of the operand indicates whether a value of the input operand has a predetermined value (e.g., logic value '0') or not. For example, the MAC controller 210 determines whether a value of the input operand is '0' or not. If the value of the input operand is '0', the control circuitry may determine that the input operand is sparse. If the value of the input operand is not '0', the control circuitry may determine that the input operand is not sparse.

In one approach, the control circuitry determines 530 a stationarity of the input operand. In one aspect, the stationarity indicates whether the value of the input operand remains unchanged for a predetermined period of time (e.g., a predetermined number of clock cycles). For instance, if the value of the input operand changes within the predetermined number of clock cycles, the control circuitry may determine that the input operand is not stationary. If the value of the input operand remains unchanged for the predetermined number of clock cycles, the control circuitry may determine that the input operand is stationary.

In one approach, the control circuitry configures additional circuitry (e.g., holding circuitry 220) to provide 540 the input operand to the MAC circuitry as an input, according to the determined sparsity and stationarity of the input operand. For example, the control circuitry generates one or more control signals (e.g., load signal and bubble signal) according to the determined sparsity and stationarity of the input operand, and provides the control signals to the holding circuitry, as described above with respect to FIGS. 3 and 4. According to the control signals by the control circuitry, the MAC circuitry 140 can perform multiply-accumulation operations while obviating unnecessary toggling to reduce power consumption or improve power efficiency.

Figure 6:
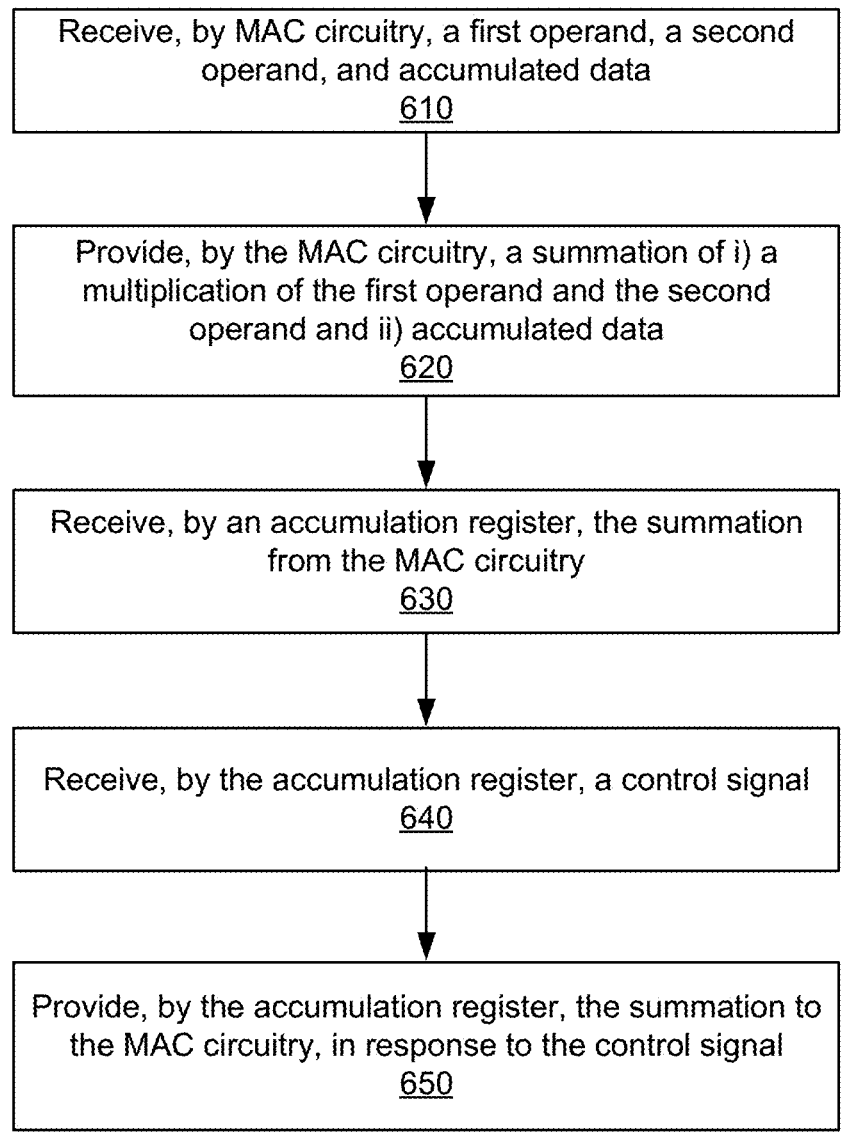
FIG. 6 is a flow chart illustrating a process of operating the MAC circuitry, according to an example implementation of the present disclosure.

Referring to FIG. 6, illustrated is a flow chart illustrating a process 600 of operating the MAC circuitry, according to an example implementation of the present disclosure. In some embodiments, the process 600 is performed by the AI accelerator 108 of FIG. 2. In other embodiments, the process 600 is performed by other entities. In some embodiments, the process 600 includes more, fewer, or different steps than shown in FIG. 6.

In one approach, the MAC circuitry 140 receives 610 a first operand, a second operand, and accumulated data. The first operand may include a weight for the neural network computation and the second operand may include an activation value for the neural network computation. The first operand and the second operand may be represented in integer format or a decimal format. In one approach, the MAC circuitry 140 provides 620 a summation of i) a multiplication of the first operand and the second operand, and ii) the accumulated data to an accumulation register (e.g., accumulation register 370 of FIG. 3). In some embodiments, the accumulation register 370 receives 630 the summation data from the MAC circuitry. In one approach, the accumulation register 370 receives 640 a control signal indicating whether both values of the first operand and the second operand are non-zero. In one approach, the accumulation register 370 provides the summation to the MAC circuitry, in response to the control signal indicating that both the values of the first operand and the second operand are non-zero. The accumulation register 370 may bypass providing the summation to the MAC circuitry, in response to the control signal indicating that at least one of a first value of the first operand or a second value of the second operand is zero. In one approach, an AND logic operation may be performed on a first signal indicating whether a first value of the first operand is non-zero and a second signal indicating whether a second value of the second operand is non-zero to generate the control signal. In one approach, the accumulation register 370 may bypass providing the summation to the MAC circuitry, in response to the control signal indicating that at least one of a first value of the first operand or a second value of the second operand is zero.

In one aspect, a control circuitry (e.g., MAC controller 210) may detect sparsity and stationarity of the first operand and the second operand, and generate the control signal according to the detected sparsity and the stationarity. In one approach, the control circuitry determines whether the first operand has a zero value or not to determine whether the first operand is sparse or not. If the first operand has a zero value, the control circuitry may determine that the first operand is sparse. If the first operand has a non-zero value, the control circuitry may determine that the first operand is not sparse. In one approach, the control circuitry compares the value of the first operand at two or more different clock cycles to determine whether the first operand is stationary or not. For example, if the value of the first operand changed within a predetermined number of clock cycles, then the control circuitry determines that the first operand is not stationary. If the value of the first operand did not change within the predetermined number of clock cycles, then the control circuitry determines that the first operand is stationary.

In one approach, the first operand may be provided to the MAC circuitry by a first input register, in response to at least one of i) the first signal indicating that the first value of the first operand is non-zero, or ii) a third signal indicating that the first value of the first operand has changed. The second operand may be provided to the MAC circuitry by a second input register, in response to at least one of i) the second signal indicating that the second value of the second operand is non-zero or ii) a fourth signal indicating that the second value of the second operand has changed. An OR logic operation may be performed by an additional circuitry on the first signal and the third signal to generate another control signal. The another control signal may be provided to the first input register by the additional logic circuitry. The first input register may be configured to provide the first operand to the first input of the MAC circuitry, in response to the another control signal being non-zero.

In one aspect, accumulation may be performed by the MAC circuitry 140 by updating accumulated data to be the summation data, and providing the updated accumulated data to the MAC circuitry. Moreover, accumulation may be disabled or bypassed by not updating the accumulated data. Disabling or bypassing accumulation allows unnecessary toggling by the MAC circuitry 140 to be avoided and reduce power consumption.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A device comprising:
   multiplier and accumulator (MAC) circuitry including:
   a first input to receive a first operand for a neural network computation,
   a second input to receive a second operand for the neural network computation,
   a third input to receive an accumulated data for the neural network computation, and
   an output to provide a summation of i) a multiplication of the first operand and the second operand, and ii) the accumulated data; and
   an accumulation register including:
   a first input to receive the summation from the output of the MAC circuitry,
   a second input to receive a control signal indicating whether both values of the first operand and the second operand are non-zero, and
   an output to provide the summation to the third input of the MAC circuitry, in response to the control signal indicating that both the values of the first operand and the second operand are non-zero.

2. The device of claim 1, wherein the accumulation register is configured to bypass providing the summation to the third input of the MAC circuitry, in response to the control signal indicating that at least one of a first value of the first operand or a second value of the second operand is zero.

3. The device of claim 1, further comprising:
   logic circuitry configured to perform an AND logic operation on a first signal and a second signal to generate the control signal, the first signal indicating whether a first value of the first operand is non-zero and the second signal indicating whether a second value of the second operand is non-zero.

4. The device of claim 3, further comprising:
   a first input register including an output to provide the first operand to the first input of the MAC circuitry, in response to at least one of i) the first signal indicating that the first value of the first operand is non-zero, or ii) a third signal indicating that the first value of the first operand has changed.

5. The device of claim 4, further comprising:
   a second input register including an output to provide the second operand to the second input of the MAC circuitry, in response to at least one of i) the second signal indicating that the second value of the second operand is non-zero or ii) a fourth signal indicating that the second value of the second operand has changed.

6. The device of claim 5, further comprising:
   control circuitry configured to:
   compare the first value of the first operand at a clock cycle and a third value of the first operand at a previous clock cycle, and
   generate the third signal indicating that the first value of the first operand has changed, in response to the first value of the first operand at the clock cycle and the third value of the first operand at the previous clock cycle being different.

7. The device of claim 6, wherein the control circuitry is further configured to:
   compare the second value of the second operand at the clock cycle and a fourth value of the second operand at the previous clock cycle, and
   generate the fourth signal indicating that the second value of the second operand has changed, in response to the second value of the second operand at the clock cycle and the fourth value of the second operand at the previous clock cycle being different.

8. The device of claim 4, further comprising:
   additional logic circuitry configured to:
   perform an OR logic operation on the first signal and the third signal to generate another control signal, and
   provide the another control signal to the first input register, the first input register configured to provide the first operand to the first input of the MAC circuitry, in response to the another control signal being non-zero.

9. The device of claim 8, further comprising:
   control circuitry coupled to the additional logic circuitry, the control circuitry configured to:
   generate the first signal and provide the first signal to the additional logic circuitry.

10. The device of claim 1, wherein the first operand comprises a weight for the neural network computation and the second operand comprises an activation value for the neural network computation.

11. A method comprising:
    receiving, by multiplier and accumulator (MAC) circuitry, a first operand for a neural network computation, a second operand for the neural network computation, and an accumulated data for the neural network computation;
    providing, by the MAC circuitry, a summation of i) a multiplication of the first operand and the second operand, and ii) the accumulated data;
    receiving, by an accumulation register, the summation from the MAC circuitry;
    receiving, by the accumulation register, a control signal indicating whether both values of the first operand and the second operand are non-zero; and
    providing, by the accumulation register, the summation to the MAC circuitry, in response to the control signal indicating that both the values of the first operand and the second operand are non-zero.

12. The method of claim 11, further comprising:
    bypassing, by the accumulation register, providing the summation to the MAC circuitry, in response to the control signal indicating that at least one of a first value of the first operand or a second value of the second operand is zero.

13. The method of claim 11, further comprising:
    performing, by logic circuitry, an AND logic operation on a first signal and a second signal to generate the control signal, the first signal indicating whether a first value of the first operand is non-zero and the second signal indicating whether a second value of the second operand is non-zero.

14. The method of claim 13, further comprising:
    providing, by a first input register, the first operand to the MAC circuitry, in response to at least one of i) the first signal indicating that the first value of the first operand is non-zero, or ii) a third signal indicating that the first value of the first operand has changed.

15. The method of claim 14, further comprising:
    providing, by a second input register, the second operand to the MAC circuitry, in response to at least one of i)

the second signal indicating that the second value of the second operand is non-zero or ii) a fourth signal indicating that the second value of the second operand has changed.

16. The method of claim 15, further comprising:
comparing, by control circuitry, the first value of the first operand at a clock cycle and a third value of the first operand at a previous clock cycle; and
generating, by the control circuitry, the third signal indicating that the first value of the first operand has changed, in response to the first value of the first operand at the clock cycle and the third value of the first operand at the previous clock cycle being different.

17. The method of claim 16, further comprising:
comparing, by the control circuitry, the second value of the second operand at the clock cycle and a fourth value of the second operand at the previous clock cycle; and
generating, by the control circuitry, the fourth signal indicating that the second value of the second operand has changed, in response to the second value of the second operand at the clock cycle and the fourth value of the second operand at the previous clock cycle being different.

18. The method of claim 14, further comprising:
performing, by additional logic circuitry, an OR logic operation on the first signal and the third signal to generate another control signal; and
providing, by the additional logic circuitry, the another control signal to the first input register, the first input register configured to provide the first operand to the first input of the MAC circuitry, in response to the another control signal being non-zero.

19. The method of claim 18, further comprising:
generating, by control circuitry coupled to the additional logic circuitry, the first signal; and
providing, by the control circuitry, the first signal to the additional logic circuitry.

* * * * *